H. A. HATFIELD.
MOTOR DRIVEN VEHICLE HAVING ENDLESS TRACKS.
APPLICATION FILED JUNE 13, 1918.
1,299,937.
Patented Apr. 8, 1919.
2 SHEETS—SHEET 1.
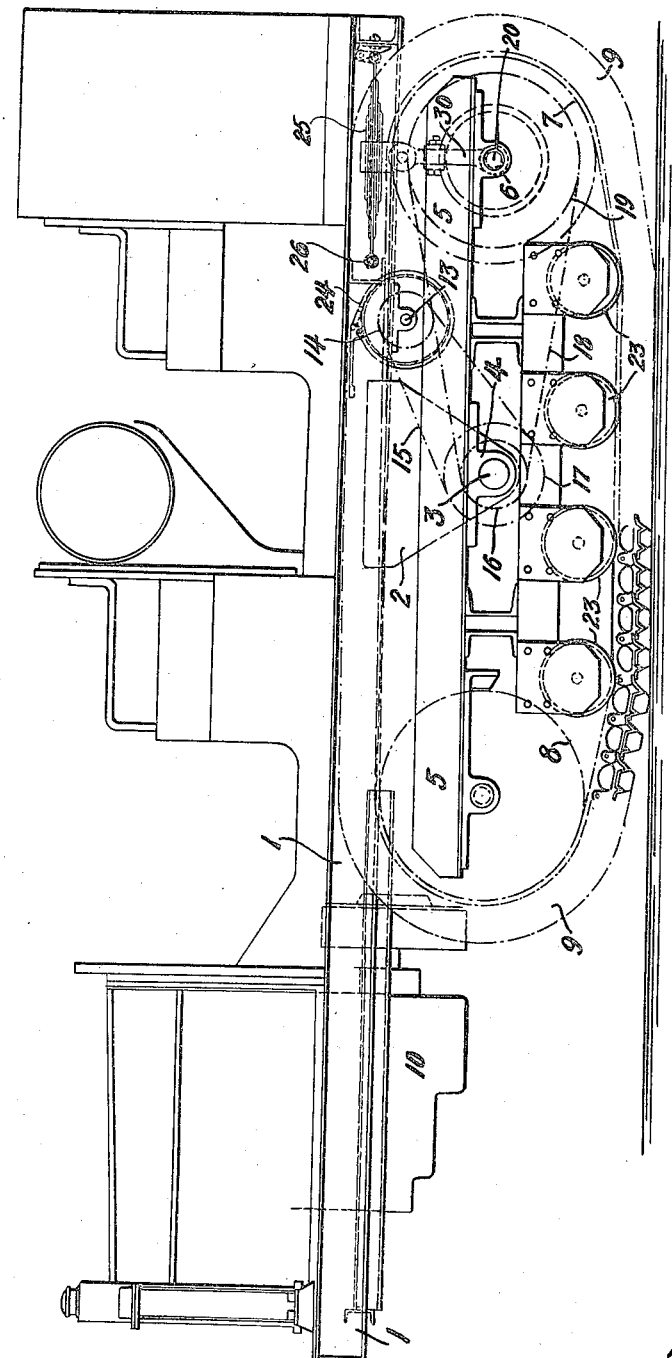

H. A. HATFIELD.
MOTOR DRIVEN VEHICLE HAVING ENDLESS TRACKS.
APPLICATION FILED JUNE 13, 1918.
1,299,937.
Patented Apr. 8, 1919.
2 SHEETS—SHEET 2.
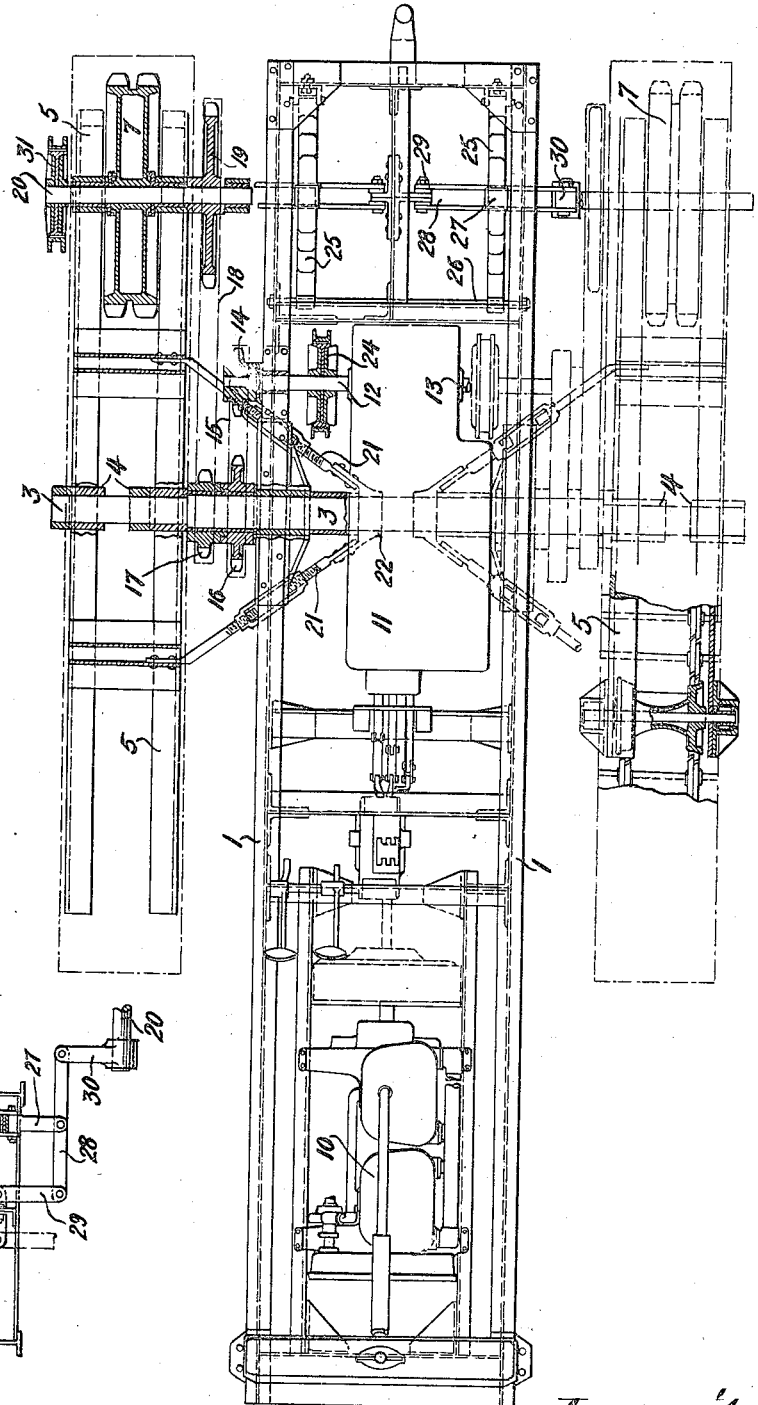

UNITED STATES PATENT OFFICE.

HUBERT AVERY HATFIELD, OF LONDON, ENGLAND, ASSIGNOR TO H. A. H. TRACTORS LIMITED, OF BIRMINGHAM, ENGLAND.

MOTOR-DRIVEN VEHICLE HAVING ENDLESS TRACKS.

1,299,937. Specification of Letters Patent. Patented Apr. 8, 1919.

Application filed June 13, 1918. Serial No. 239,836.

*To all whom it may concern:*

Be it known that I, HUBERT AVERY HATFIELD, a subject of the King of Great Britain, at present serving with His Majesty's forces in France, and resident of London, England, have invented certain new and useful Improvements in Motor Driven Vehicles Having Endless Tracks, of which the following is a specification.

This invention refers to improvements in or relating to motor-driven vehicles which are wholly or mainly supported upon endless self-laying tracks, and through the medium of which said vehicles receive motion of translation, and the invention has particular reference to such vehicles in which there is a transverse shaft extending across and carried from the main framework of the machine, and pivoted upon the ends of this shaft are two track frames one on each side of the vehicle, which track frames are free to rock about the shaft, and each track frame carries two main sprocket wheels which carry the endless flexible track, and said track frames also carry wheels to support the length of the track between the main sprocket wheels, the rear main sprocket wheel being generally driven.

In such machines according to this invention the transverse shaft (hereinafter termed the main pivotal shaft) extends beyond each side of the chassis of the vehicle to which it is fixed and further, is located rearward of the center of gravity of the chassis, the ends of said main pivotal shaft being carried in bearings fixed to the frames of the endless tracks, said bearings being located on said frames between the main forward and rearward carrying wheels of each track, so that each endless track frame can have independent angular movements about the pivotal shaft, such movements being resiliently limited in extent by each track frame having an independent spring connection between itself and the chassis of the vehicle.

The endless tracks are driven through the rear main driving wheels, the shafts of which receive motion by means of chains arranged so as to permit of independent relative angular motions about the main pivotal shaft, between the track frames and the chassis of the vehicle, such motion to the rear main carrying wheels being communicated from a transversely extending divided shaft, the portions of which receive motion through transmission gear of any ordinary type from the motive power carried by the vehicle, so that the machine can be steered by applying power to one portion while retarding the speed of another portion of the divided driving shaft by any convenient brake mechanism.

In order to support the track frames and prevent internal rocking movements of same, angularly extending tension stays are fitted, the outer ends of which are connected to the track frames, while the inner ends are connected to collars angularly movable upon the main pivot shaft.

Each track is driven by a rear main driving wheel which is formed with sprocket teeth to engage the pivot pins of the track, while the front main carrying wheel of the track has smooth circular surfaces upon which the pivots of the track bear, and the lower length of the track is maintained in a straight line by flanged supporting wheels, the main driving and carrying wheels and the said supporting wheels being so arranged that the track, after leaving the front carrying wheel, extends at an incline downward, then is maintained in a straight line, and after leaving the rear supporting wheel extends at an angle upward to the main driving sprocket wheel.

An example of construction of an endless track vehicle according to this invention will be described with reference to the accompanying drawings, which show so much of said vehicle as will be necessary for the purposes of this specification.

Figure 1 is a side elevation, and Fig. 2 is a sectional plan of my improved endless track vehicle. Fig. 3 is a sectional rear half end elevation illustrating a detail of construction.

Referring to the drawings, the framework 1 of the chassis carries by means of downwardly extending bearing brackets 2, Fig. 1, the main pivotal shaft 3 extending beneath the framework 1 of the chassis and from side to side transversely of the longitudinal axis of the machine. The ends of this main pivotal shaft 3, projecting beyond the sides of the framework 1, pass into bearings 4 fixed to or forming part of two endless track frames 5, there being an endless track frame 5 parallel with and upon each side of the chassis; and each track frame 5, Fig. 1, carries near its rear and forward ends, bearings 6 to support the axles of a main driving wheel 7 and a main carrying wheel 8, over which wheels 7 and 8 the endless track 9 passes, and by one of which wheels, namely the rear wheel 7, the track 9 is driven to bring about a motion of translation of the vehicle.

It is to be observed that according to this invention the center of gravity of the chassis of the machine is located slightly forward of the main pivotal shaft, that is the main pivotal shaft is rearward of the center of gravity of the chassis, and means are provided, all as hereafter described, to independently and resiliently limit any turning movement of the chassis about the axis of the main pivotal shaft 3, the rear end of each track frame being to this end independently connected by resilient connecting devices to the rear part of the chassis of the vehicle, means to this end as aforesaid being hereafter shown.

The chassis framework 1 carries the motive power, such as an explosion engine located at 10, which drives, through any well known change speed and transmission gear inclosed in a gear box 11, Fig. 2, a divided transverse shaft of which the two portions projecting from the gear box will for brevity of description be referred to as the driving shafts 12 and 13.

Both the driving shafts 12 and 13 are supported near their outer ends in bearings carried on the chassis frame 1, and at its outer end the driving shaft 12 has fixed to it a sprocket pinion 14, and also at its outer end the driving shaft 13 has fixed to it a similar sprocket pinion 14, Fig. 1.

The drawing of the left-hand side of the machine shown at Fig. 2 looking in the direction of motion, is not shown so completely as the right-hand side, it being unnecessary in view of the fact that the parts at the sides of the machine are symmetrical; it will therefore be sufficient if the driving mechanism on one side of the machine is described, the driving mechanism on the opposite side of the machine being referred to where shown by the same reference numerals.

Upon each side of the machine the sprocket pinion 14 is connected by an endless chain 15 to a sprocket wheel 16 freely revoluble upon the main pivotal shaft 3, and the sprocket wheel 16 is in fixed connection with a sprocket pinion 17 which revolves consequently with the wheel 16. The sprocket pinion 17 is connected by an endless chain 18 with a sprocket wheel 19 fixed on a shaft 20, which shaft is carried in bearings 6 at the rear of the track frame 5, and upon the shaft 20 within the track frame 5 is fixed the main driving wheel 7 over which the rear part of the endless track 9 passes, and by which the rear part of the track is carried, and through which the track is given motion.

By this arrangement of gearing it will be observed that the track frame and the parts which it carries are capable of oscillating about the main pivotal shaft 3 without interfering with the driving mechanism.

As aforesaid, each track frame 5 can have angular motions about the axis of the main pivotal shaft 3, and in order to laterally support the track frame, each frame 5 is connected by forwardly and rearwardly extending tension stays 21, the outer ends of which are connected to the track frame 5 on opposite sides of the pivotal shaft 3, while the inner ends of each pair of stays 21 are connected to a collar 22 mounted so as to be capable of angular but not endwise movements upon the pivotal shaft 3.

Carried in the bearings 6 at the forward end of each track frame 5, is the front main carrying wheel 8 before mentioned, and in the construction shown the rear main driving wheel 7 is formed with teeth which engage pivot pins on the inner side of the endless track 9, while the front carrying wheel 8 may have a plain periphery; the track frame 5 also carries in suitable bearings, supporting wheels 23 bearing on the lower inner surface of the length of the track between the two main wheels 7 and 8, the said supporting wheels 23 resisting upward pressure of the track, and the track frame 5 may and usually does carry supporting wheels to support the upper length of the track, although such are not shown in the drawings. The bearings 6 of the front main carrying wheels 8 are or should be mounted so as to be capable of sliding adjustment in the direction of the length of the track so as to place the said track in the proper degree of tension, and it will be observed that the lower length of the track, after leaving the front carrying wheel 8, extends at an incline downward to the front supporting wheel 23, and after leaving the rear supporting wheel 23 the track extends at an angle upward to the main driving wheel 7, this arrangement facilitating the mounting of the track over obstacles, and the supporting wheels 23, as shown at Fig. 2, are flanged and each pair is formed in one piece, and as the supporting wheels bear on upstanding ribs of the track they steady the said track and prevent lateral movements.

In order that the vehicle may be steered, a brake 24 is fitted to act upon each driving shaft 12 and 13, the brakes being operated by the driver through any convenient connections in such manner that both brakes may be out of action when the vehicle is traveling in a straight line, while either one brake or the other may be brought into action to produce a turning movement. When for instance the brake on the right-hand driving shaft 12 is applied, the motion of the right-hand track will be retarded, while the motion of the left-hand track will be accelerated and the machine will turn toward the right hand, and will turn toward the left hand when the action of the brakes is reversed, and by this arrangement steering wheels of the vehicle can be dispensed with, such being calculated to absorb the motive power and obstruct the movements of the machine.

The center of gravity of the chassis of the machine is located slightly forward of the main pivotal shaft 3, and to limit any turning movement of the chassis about the shaft 3, the rear end of each of the track frames is independently connected by resilient connecting devices to the rear part of the chassis of the vehicle, and in the present construction this is effected by the arrangement shown in the drawings, where on each side of the longitudinal axis of the vehicle similar connections are fitted, one of which will now be described.

Carried by and upon each side frame of the chassis and at the rear part of same is a spring 25, (see particularly Figs. 1 and 3) one end of each spring 25, for example, being carried by a pivot pin 26, while the other end is carried by a link. Each spring 25 is connected by a downwardly extending arm 27 to a two-armed lever 28 which is capable of rocking on a pin carried by the arms 27. The inner end of the lever 28 is connected by pivoted links 29 to the chassis at about the central part thereof, while the other end of the lever 28 is pivoted to an arm 30, the lower end of which is provided with a bearing embracing the inner end of the shaft 20 which carries the main driving wheel 7.

The springs 25 thus resiliently restrain and limit the angular movements of the track frames 5 about the main pivotal shaft 3, and hence the said track frames 5 may have resilient angular movements about the pivotal shaft 3, such movements of the track frames on one side of the vehicle being independent of the movements of the track frame upon the other side.

By placing the center of gravity of the chassis of the vehicle slightly forward of the main pivotal shaft 3, the grip and tractive effort of the forward part of the track is increased.

Where required a brake, such as 31 Fig. 2, may be fitted on each shaft 20 carrying the main driving wheels 7.

What I claim as my invention and desire to secure by Letters Patent is:—

1. In motor driven vehicles having endless tracks the frame of each track being pivotally mounted upon a shaft extending transversely and beyond the chassis of the vehicle substantially as specified; the combination of the pivotal shaft fixed to and extending transversely of the chassis, an endless track frame freely and pivotally mounted on each end of said pivotal shaft, two springs one for each track frame one carried on each side of the chassis frame at the rear thereof, an arm extending downward from each spring, a two-armed lever fulcrumed on each downwardly extending arm and extending transversely of the length of the chassis, links to pivotally connect the inner arm of each lever to said chassis, and an arm pivoted at one end to the opposite arm of said two-armed lever and at the opposite end connected to the rear end of the track frame, to permit each track frame to have independent and limited resilient motions controlled by said spring appertaining to each frame.

2. In motor-driven vehicles having endless tracks the frame of each track being pivotally mounted upon a shaft extending transversely and beyond the chassis of the vehicle substantially as specified; the combination of the pivotal shaft fixed to and extending transversely of the chassis, and endless track frame freely and pivotally mounted on each end of said pivotal shaft, means for resiliently and independently connecting the rear end of each track frame to the rear end of said chassis to limit the independent angular movements of said track frames about said pivotal shaft, means for laterally supporting each track frame while permitting of said resilient independent angular movements, consisting for each track frame, of a stay connected to said track frame forward of said main pivotal shaft and a similar stay connected to said track frame rearward of said pivotal shaft, a collar on said pivotal shaft capable of angular movements thereon but not endwise movements, and means for connecting the inner ends of said stays to said angularly movable collar on said pivotal shaft.

3. In motor-driven vehicles having endless tracks the frame of each track being pivotally mounted upon a shaft extending transversely and beyond the chassis of the vehicle substantially as specified; the combination with the pivotal shaft fixed to and extending transversely of the chassis, an endless track frame freely and pivotally mounted on each end of said pivotal shaft and resilient connecting devices connecting the rear end of each track frame to the rear part of the chassis of the vehicle to permit said track frames to have independent and limited resilient angular motions about the axis of said pivotal shaft; of a divided driving shaft extending transversely of the chassis and carried therefrom, transmission gear connecting the parts of said driving shaft, means for driving the transmission gear, a sprocket wheel on one part of said driving shaft, a sprocket wheel freely mounted on said pivotal shaft and a chain connecting said sprocket wheels, a sprocket wheel fixed to said sprocket wheel on said pivotal shaft, a sprocket wheel on the axle of the rear track driving wheel of the track frame, and a chain connecting said sprocket wheels to communicate motion to said rear track driving wheel and to permit of independent rocking movements of each track frame about said pivotal shaft.

4. In motor-driven vehicles having endless tracks the frame of each track being pivotally mounted upon a shaft extending transversely and beyond the chassis of the vehicle substantially as specified; the combination with the pivotal shaft fixed to and extending transversely of the chassis, an endless track frame freely and pivotally mounted on each end of said pivotal shaft, and resilient connecting devices connecting the rear end of each track frame to the rear part of the chassis of the vehicle to permit said track frames to have independent and limited resilient angular motions about the axis of said pivotal shaft; of a divided driving shaft extending transversely of the chassis and carried therefrom, transmission gear connecting the parts of said driving shaft, means for driving the transmission gear, a sprocket wheel on one part of said driving shaft, a sprocket wheel freely mounted on said pivotal shaft and a chain connecting said sprocket wheels, a sprocket wheel fixed to said sprocket wheel on said pivotal shaft, a sprocket wheel on the axle of the rear track driving wheel of the track frame and a chain connecting said sprocket wheels to communicate motion to said rear track driving wheel and to permit of independent rocking movements of each track frame about said pivotal shaft, and a brake device to retard the speed of one or other part of said divided driving shaft to steer the vehicle.

In witness whereof I have hereunto set my hand in the presence of two witnesses.

HUBERT AVERY HATFIELD.

Witnesses:
 NORMAN GRENVILLE NOTLEY,
 ROBERT PARKER LYLE.